United States Patent Office 3,151,174
Patented Sept. 29, 1964

3,151,174
1,1-DIMETHYL TETRAHYDRONAPHTHINDANS AND PROCESS FOR PREPARING SAME
Thomas F. Wood, Wayne, and John T. Angiolini, Clifton, N.J., assignors to The Givaudan Corporation, New York, N.Y., a corporation of New Jersey
No Drawing. Filed May 2, 1961, Ser. No. 107,024
9 Claims. (Cl. 260—668)

This invention relates to 1,1-dimethyltetrahydronaphthindans and to a method for preparing them.

An object of this invention is to provide a novel family of compounds having beneficial properties. Another object is to produce these novel materials by a simple, convenient and inexpensive process, readily adaptable to commercial usage. Other objects will become apparent from the following description.

The products of this invention and the principal process for their preparation may be represented by the following reaction:

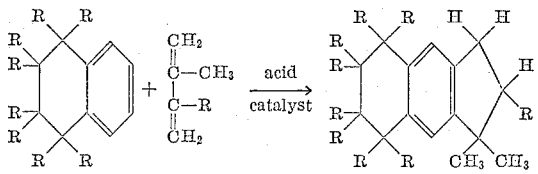

where the R's may be H or $CH_3$, alike or different.

Advantageously, the novel hydrocarbons of this invention are obtained by the condensation of isoprene or 2,3-dimethyl-1,3-butadiene with a tetrahydronaphthalene.

In general the reaction is conveniently carried out by the slow addition of the "-diene" or a solution of the "-diene" in an inert solvent or in the tetrahydronaphthalene to a cold, rapidly-stirred (−10 to 10° C.) suspension of the tetrahydronaphthalene in aqueous concentrated sulfuric acid (93%). The reaction temperature is maintained at −10 to 10° C. during the addition which usually requires from 2 to 3 hours depending on the efficiency of the cooling. After addition is completed, the mixture is stirred a short time and quenched, or the acid separated. After being washed neutral the solution is vacuum-distilled to yield the tetrahydronaphthindan. An alternate mode of operation is to feed a solution of the "-diene" and all of the tetrahydronaphthalene slowly into the cold sulfuric acid.

It is an advantage of this process that it may be operated at low temperature under atmospheric pressure. The preferred reaction temperature is considerably lower than the boiling point of isoprene and this reduces the hazard of fire and explosion. Furthermore, apparatus suitable for carrying out reactions under atmospheric pressure is considerably cheaper and simpler in construction and design than that required for pressure reactions.

Representative of bicyclic hydrocarbons which may be condensed with isoprene or 2,3-dimethyl-1,3-butadiene by the process of this invention are 1,2,3,4-tetrahydronaphthalene, 1,1,4,4 - tetramethyl - 1,2,3,4 - tetrahydronaphthalene.

While aqueous sulfuric acid of about 93% concentration gives advantageous results, sulfuric acid of other concentrations, as well as other condensing catalysts may be used in accordance with the present invention. Thus, sulfuric acid within the range from about 75% to about 96% strength has been found to give desirable results. The 93% strength sulfuric acid is preferred because it is commercially available, gives excellent yields with a minimum of by-products and has a low freezing point much below the temperature of the reaction.

Other acids which may be used as condensing catalysts herein are those acids which are capable of acting as Friedel-Crafts condensening catalysts. Examples of such acids are phosphoric acid, polyphosphoric acid, boron trifluoride-water complex and hydrofluoric acid.

In carrying out the process of this invention the proportions of the ingredients may be varied over wide limits. It is preferred to use at least 1 mol and advantageously 2 to 10 mols of the tetrahydronaphthalene per mol of diolefin in order to minimize side reactions, such as polymerization of the diolefin. The acid catalysts may be employed in amounts varying from about 5 to about 100%, by weight, based on the tetrahydronaphthalene employed.

The temperature at which the process of this invention is carried out may also be varied over wide limits, i.e., from about −30° C. to about 150° C. When sulfuric acid is employed, the temperature may advantageously be from about −30° C. to about 80° C. In general, the higher the acid strength the lower the temperature to be used. Thus, when sulfuric acid of about 75%–80% strength is used, a temperature above 30° C., preferably about 60° C. to 80° C. is desirable. When sulfuric acid of 85–90% strength is used, a temperature of about 5° C. to about 50° C. is suitable. With sulfuric acid of 90%–95% strength, a temperature from about −30° C. to about 15° C., preferably from about −10° C. to 10° C., is desirable.

When milder condensing acids, such as phosphoric and polyphosphoric acids, are used, higher reaction temperatures, such as about 105° C. to 150° C., are suitable. Anhydrous HF is active at about the same temperatures as 93% sulfuric acid, namely, −30° to 50° C. The $BF_3 \cdot H_2O$ catalyst is quite active at 25° to 35° C.

The tetrahydronaphthindans formed by the process (and examples) of this invention are suitable for use as chemical intermediates, intermediates for odorants, including musk odorants, low cost aromatic solvents, diesel fuel additives, and as intermediates for the preparation of saturated tricyclic decahydronapththindans with the desirable characteristics required in jet fuels. These saturated decahydronaphthindans may be prepared by hydrogenating the tetrahydronaphthindans formed by the present process at elevated temperatures, e.g., 200° C. or higher, in the presence of Raney nickel as catalyst.

The invention is further illustrated by the following examples without, however, limiting it to them. The temperatures given in the specification are in degrees centigrade, unless otherwise stated.

EXAMPLE I 1,1-Dimethyl-5,6,7,8-Tetrahydro-β-Naphthindan and Isomers

Into a rapidly stirred mixture of 308 g. of 93% sulfuric acid and 750 g. of 1,2,3,4-tetrahydronaphthalene cooled to −5°, there was slowly added dropwise a solution of 115 g. of isoprene (1.69 moles) in 160 g. of 1,2,3,4-tetrahydronaphthalene over a 4 hr. period, keeping the temperature at −4 to 0° throughout the feeding period. Stirring was continued for 40 minutes after the feed. After allowing to settle in the cold (0–5°) the lower sulfuric acid layer was separated, and the remaining oil layer was washed successively with water (200 ml.), 5% caustic soda solution (200 ml.), and 5% bicarbonate of soda solution (200 ml.). The resulting solution was then subjected to vacuum-distillation, yielding, after removal of excess 1,2,3,4-tetrahydronaphthalene (750 g. recovered), the desired 1,1-dimethyl-5,6,7,8 - tetrahydro - β - naphthindan (and isomers) as a colorless liquid, B.P. 108° (1.5 mm.), $n_D^{20}$ 1.5437–58, sp. gr. 25°/25°, 0.9768, amounting to 173 g. This hydrocarbon is suitable as an intermediate for the preparation of fuel for jet engines, as aforesaid.

Analysis.—Calcd. for $C_{15}H_{20}$: C, 90.0; H, 10.0. Found: C, 90.37; H, 9.82.

4-Acetyl-1,1-Dimethyl-5,6,7,8-Tetrahydro-β-Naphthindan and Isomers

The acetyl derivative was prepared by feeding the above tetrahydro-β-naphthindan (70 g.) into a cold (0°) mixture of carbon tetrachloride (263 ml.), granular aluminum chloride (52.5 g.), and acetyl chloride (35.0 g.), over a 3 hr. period. After two hours additional stirring at 1 to 3° the batch was quenched on cracked ice (300 g.). The resulting $CCl_4$ solution was washed successively with water (2 x 150 ml.) and 5% sodium carbonate solution (150 ml.). After removal of the carbon tetrachloride the acetyl derivative was purified by vacuum distillation and obtained as a viscous pale yellow liquid, B.P. 151–153° (2 mm.), $n_D^{20}$ 1.5532–80, which exhibited a rather strong animal-like odor. The distillate became semi-crystalline on standing. After filtration from the liquid portion and recrystallization from ethyl alcohol the solid isomer was obtained as a colorless product, M.P. 78.5–79°, having an animal-like odor reminiscent of fur and being useful in perfumery as an olfactory material.

*Analysis.*—Calcd. for $C_{17}H_{22}O$: C, 84.2; H, 9.13. Found: C, 83.85; H, 8.84.

EXAMPLE II

1,1,5,5,8,8-Hexamethyl-5,6,7,8-Tetrahydro-β-Naphthindan

Into a rapidly stirred mixture of 196 g. of 93% sulfuric acid and 405 g. of 1,1,4,4-tetramethyl-1,2,3,4-tetrahydronaphthalene, chilled to —5°, was slowly added dropwise a solution of 68 g. of isoprene (1 mole) in 188 g. of 1,1,4,4-tetramethyl-1,2,3,4 - tetrahydronaphthalene during a 2½ hour period while the temperature was maintained at —5° to +1°. Stirring was continued for a period of 40 minutes after the feed. After being allowed to settle in the cold (0–5°) the lower sulfuric acid layer (242 g.) was separated and the remaining oil layer was washed successively with water (200 ml.), 5% sodium hydroxide solution (200 ml. aqueous solution), and 5% sodium bicarbonate solution (200 ml.). The washed oil was vacuum-distilled. There was recovered 407 g. of excess 1,1,4,4-tetramethyl-1,2,3,4-tetrahydronaphthalene. After an intermediate fraction, B.P. 73–118° (0.8 mm.), amounting to 37 g., there was obtained 53 g. of the desired product, B.P. 118–120° (0.8 mm.), which rapidly solidified. Upon recrystallization from twice its weight of ethyl alcohol it was obtained as a colorless solid, M.P. 64.5–65.5°. The infrared curve showed the absorption at 5.75μ which is characteristic of 1,2,4,5-tetrasubstituted benzenes (C. W. Young, R. B. Du Vall and N. Wright, Anal. Chem. 23, 709 [1951]). The vapor-phase chromatogram showed a single compound.

The product of this example, upon hydrogenation as aforesaid yields a jet fuel.

*Analysis.*—Calcd. for $C_{19}H_{28}$: C, 89.06; H, 10.94. Found: C, 88.86; H, 10.72.

The foregoing illustrates the invention, which, however, is not to be limited thereby, but is to be construed as broadly as permissible in view of the prior art and limited solely by the appended claims. It is understood that the recitation herein of a formula for the novel compounds is intended to include a mixture containing isomers of the named compounds wherein the context so admits or requires.

We claim:
1. A compound represented by the formula:

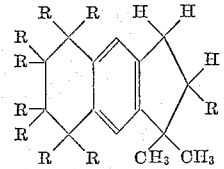

wherein R is a member selected from the group consisting of H and $CH_3$.

2. 1,1,5,5,8,8-hexamethyl-5,6,7,8-tetrahydro - β - naphthindan.

3. Mixtures of 1,1-dimethyl-5,6,7,8-tetrahydro-β-naphthindan and isomers thereof.

4. The process for preparing compounds which may be represented as follows:

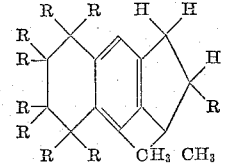

wherein R is a member selected from the group consisting of H and $CH_3$, which comprises reacting a bicyclic hydrocarbon having the formula:

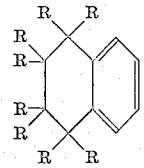

wherein the R's have the same significance as above, with a member selected from the group consisting of isoprene and 2,3-dimethyl-1,3-butadiene, in the presence of a member selected from the group consisting of sulfuric acid, phosphoric acid, polyphosphoric acid, boron trifluoride-water complex and hydrofluoric acid, at a temperature within the range from about —30° C. to about 150° C.

5. The process of claim 4, wherein isoprene is employed.

6. The process of claim 5, wherein 1,2,3,4-tetrahydronaphthalene is the bicyclic hydrocarbon employed.

7. The process of claim 4, wherein 2,3-dimethyl-1,3-butadiene is employed.

8. The process of claim 4, wherein said catalyst is aqueous sulfuric acid of about 75 to about 96% concentration and said temperature is within the range from about —30° C. to about 80° C.

9. The process of claim 4, wherein the catalyst is sulfuric acid of about 93% concentration and the temperature is within the range from about —10° C. to about 10° C.

References Cited in the file of this patent

UNITED STATES PATENTS 2,904,607     Mattox et al. _____ Sept. 15, 1959

OTHER REFERENCES

Chemical Abstracts, vol. 41, p. 4477 (1947).
Chemical Abstracts, vol. 46, p. 5022 (1952).